United States Patent [19]

Kaiser et al.

[11] Patent Number: 5,765,022
[45] Date of Patent: Jun. 9, 1998

[54] SYSTEM FOR TRANSFERRING DATA FROM A SOURCE DEVICE TO A TARGET DEVICE IN WHICH THE ADDRESS OF DATA MOVEMENT ENGINE IS DETERMINED

[75] Inventors: John Michael Kaiser; Warren Edward Maule, both of Cedar Park, Tex.; Robert George Schaaf, Saugerties, N.Y.; David Wayne Victor, Round Rock, Tex.

[73] Assignee: International Business Machines Corporation, Armonk, N.Y.

[21] Appl. No.: 536,560

[22] Filed: Sep. 29, 1995

[51] Int. Cl.[6] .................. G06F 12/00; G06F 13/28
[52] U.S. Cl. ............ 395/842; 395/825; 395/846; 395/853; 364/238.3; 364/238.4; 364/242.31
[58] Field of Search ................ 395/400, 425, 395/325, 600, 842, 846, 825, 853; 364/242.3, 242.31, 246.3, 238.3, 238.4

[56] References Cited

U.S. PATENT DOCUMENTS

| 4,016,545 | 4/1977 | Lipovski | 395/800 |
|---|---|---|---|
| 4,513,369 | 4/1985 | Sato | 395/417 |
| 5,251,303 | 10/1993 | Fogg, Jr. et al. | 395/844 |
| 5,301,287 | 4/1994 | Herrell et al. | 395/400 |
| 5,341,494 | 8/1994 | Thayer et al. | 395/442 |
| 5,347,643 | 9/1994 | Kondo et al. | 395/421.01 |
| 5,369,738 | 11/1994 | Bemner, III | 395/126 |
| 5,379,381 | 1/1995 | Lamb | 395/826 |
| 5,390,304 | 2/1995 | Leach et al. | 395/375 |
| 5,596,376 | 1/1997 | Howe | 348/718 |

*Primary Examiner*—Thomas C. Lee
*Assistant Examiner*—Ki S. Kim
*Attorney, Agent, or Firm*—Kelly K. Kordzik; Winstead Sechrest & Minick P.C.; Anthony V.S. England

[57] ABSTRACT

PowerPC external control instructions are utilized to pass a translated address to a transfer engine located in the system memory controller, together with previously transferred parameters into control registers within the memory controller. An accelerated data movement is accomplished between system memory and an input/output device with a minimum of processor overhead and bus bandwidth utilization. This method is useful for transferring large amounts of data between memory and such devices as graphics adapters or multimedia devices.

30 Claims, 4 Drawing Sheets

SYSTEM FOR TRANSFERRING DATA FROM A SOURCE DEVICE TO A TARGET DEVICE IN WHICH THE ADDRESS OF DATA MOVEMENT ENGINE IS DETERMINED

TECHNICAL FIELD

The present invention relates in general to data processing systems, and in particular, to a system and method for transferring data between system memory and a device coupled to the data processing system.

BACKGROUND INFORMATION

Most modern computer systems today use a concept of virtual memory wherein there is more memory available to the application programs than really exists in the machine (so called real memory). This memory is called virtual because the operating system and hardware let the application think this memory is there, but in reality may not exist in physical memory accessible by the processor(s) but is instead allocated out on the system hard disk. The hardware and software translate virtual addresses issued by the program into addresses where the memory really exists, either in real physical memory or somewhere out on the hard disk. It does this on a page unit basis, which is typically 4K bytes.

These translations are kept in the processor hardware in a translation lookaside buffer ("TLB") because they are done constantly and need to be done rapidly. When a page is accessed by a processor, and it is not in real memory, a page fault interrupt occurs and the software brings in the page from disk and maps it to a real page in memory. If there was no empty real memory space to put that page in from the disk, the software first selects a page to be copied to the disk freeing up space before replacing it with the page from the disk. This is called page swapping.

In order to remove a real page from memory the software changes the hardware translation buffers (TLB) so that the old virtual addresses no longer map to their old real page location. This is called invalidating the TLB. If that virtual address is then referenced, the software will take a page fault and then know it is not in real memory and to look for it on the hard disk. When the new page is brought in from the disk, the TLB is then changed to map the new virtual address to that real page address in memory.

Today's computer systems also consist of one or more processors each having a cache memory which contains a copy of recently used data from real memory to speed up execution. When a processor fetches or stores data to memory the data is loaded or saved in its cache. A similar technique is used to save data back to memory when not recently used and to update a section of the cache with data currently being accessed by the processor(s). This is usually done entirely in hardware for increased speed of operation. When a processor is accessing cached data it causes no external bus or memory activity and therefore is extremely efficient.

In these type of computer systems, several alternatives currently exist for moving data between memory (or a processor cache when data may be modified in a processor cache) and an I/O (input/output) device. The first alternative is to have the processor issue loads and then stores directly to the devices using PIO (programmed I/O). The processor accesses memory (or cache) using a load instruction into one of its internal registers. The hardware translates the virtual address using the TLB and retrieves the data from the real memory (cache) location. As noted above, a page fault will occur if the data is not presently in real memory, and the operating system ("OS") software will swap the data in and then the access will occur. Once the data is in the processor register, it is then written to the I/O device using a store to the I/O location. (The reverse procedure is used if the I/O device is the source of the data and the memory is the target.)

This method, although simple in programming terms, has the drawback of consuming many processor cycles, since the processor is slowed by the speed of the I/O device, as well as consuming system bus and I/O bus bandwidth, since there are no burst transfers available and the transfers are limited to the processor operand sizes (words, double words, etc.). Transferring a 4K page of data in this manner would require a thousand such operations using the typical word size operand load and stores.

Another common alternative is to use Direct Memory Access (DMA) operations to transfer blocks of data from memory to I/O or vice versa. This has the advantage over the first alternative of saving many CPU cycles, using more efficient burst transfers, and potentially not using the system bus bandwidth (if due to the system organization, the traffic can be kept off of the main system (processor/memory bus); however there is still a large processor overhead involving the DMA setup, as will be explained below, and in handling the terminating interrupt, which again involves the OS kernel.

The DMA setup is complicated by the fact that when an application wishes to write or read some data from I/O from one of its virtual pages, the I/O DMA devices do not typically understand these virtual addresses, and do not know whether the data is in memory or on the hard disk. As noted before, the OS software may have temporarily swapped an applications data page out to disk.

To set up a DMA transfer requires the processor to get the source (or target) memory address, translated from a virtual address to a real memory address, and then have the OS software "pin" the real page in memory while the transfer is taking place. Both of these operations involve an OS kernel call, which can be expensive in processor cycles. The "pinning" operation is for the real page manager to mark the real page unavailable to be paged out to disk and not be replaced by the OS software. If this were allowed, the I/O device could transfer data to an application other than the one requesting the transfer, with disastrous results.

Moreover, for data intensive transfers such as graphics screen painting or multimedia device transfers the CPU overhead or system bus bandwidth is the limiting factor.

Thus, there is a need in the art for an improved system and method for transferring data in a virtual memory data processing system.

SUMMARY OF THE INVENTION

The present invention satisfies the foregoing need by providing in one embodiment a data processing system incorporating a method for transferring data from a source to a target, the method comprising the steps of (1) determining an address of the target; (2) determining an amount of the data to be transferred; (3) determining an address of the data to be transferred, the address of the data to be transferred corresponding to the source; (4) determining an address of a transfer engine to perform the transferring of the data; (5) determining an address of a memory location where status information is to be stored, wherein the status information pertains to the transferring of the data; (6) sending the address of the target, the amount of the data to be transferred, and the address of the memory location where status information is to be stored to the transfer engine; (7) sending the address of the data to be transferred to the transfer engine; (8) receiving the address of the target, the amount of the data to be transferred, the address of the memory location where status information is to be stored, and the address of the data to be transferred by the transfer engine; (9) determining if an existing data transfer is already in progress; (10) aborting the transferring of the data if it is determined that the existing data transfer is in progress; (11) issuing pairs of read/write commands that read data portions from the source and write these data portions to the target; (12) stopping issuance of the read/write command pairs when a count has been reached, wherein the count is dependent upon the amount of the data to be transferred; (13) writing an indication that the data has been transferred from the source to the target to the memory location where the status information is to be stored; (14) polling by the processor of an address pertaining to the memory location; and (15) initiating another data transfer in response to the polling step.

In one embodiment of the present invention, the data processing systems is of a PowerPC architecture, and the address of the data to be transferred by the transfer engine accompanies one of the following instructions:

eciwx (external control in word indexed); or
ecowx (external control out word indexed).

In another embodiment of the present invention, a data processing system includes a method for transferring data from a source device to a target device, wherein the method may include the steps of (1) sending parameters and one or more instructions from a processor to a memory controller for performing the transferring of the data from the source device to the target device, wherein the parameters include an address of the target device and an indication of an amount of the data to be transferred, and wherein the one or more instructions include an address of the data to be transferred, (2) receiving the parameters and the one or more instructions within the memory controller by a data movement engine, and (3) performing the transferring of the data from the source device to the target device. In such a method, the source device may be a memory device coupled to the memory controller. The target device may be a memory device coupled to the memory controller. The target device may be an I/O device coupled to the memory controller. The I/O device may be a multimedia adapter. The source device may be an I/O device coupled to the memory controller. The data processing system may be a symmetric multiprocessor system having a plurality of processors coupled to the memory controller. The step of performing within this step of performing within this method may further include the steps of (1) issuing pairs of read/write commands that read data portions from the source device and write these data portions to the target device, and (2) stopping issuance of the read/write command pairs when a count has been reached, wherein the count is dependent upon the parameter indicating the amount of the data to be transferred. The parameters may further include an address within the system memory for storing status data indicating a status of the transferring of the data, wherein the method may further comprise the step of writing the status data to the address within the system memory indicating the status of the transferring of the data. The status data may indicate if the data has been transferred from the source device to the target device. The status data may also indicate that a page boundary has been crossed. The status data may indicate that a TLB operation has been detected, and wherein the data movement engine detects the TLB operation by a snoop operation. The method within the data processing system may include the step of polling by the processor of the address within the system memory for storing the status data. The method may also include the step of initiating another data transfer in response to the polling step. Additionally, the method may include the steps of (1) computing an effective address corresponding to the address of the data to be transferred, (2) computing an address of the data movement engine, and (3) translating the effective address to a real address, wherein the real address is sent to the data movement engine. The data processing system may be of a PowerPC architecture, wherein the one or more instructions consist of one of the following instructions: (1) eciwx (external control in word index), and (2) ecowx (external control out word index). The method may further include the step of aborting the transfer if it is determined that a previous data transfer is in progress. The method may also include the step of aborting the transfer if it is determined that a parameter is faulty.

In another alternative embodiment of the present invention, the present invention includes a data processing system having a processor, a memory controller which includes a data movement engine, a memory coupled to the memory controller, a bus coupling the processor to the memory controller, an I/O device coupled to the memory controller, means for sending parameters and one or more instructions from the processor to the memory controller for performing a transfer of data from the memory to the I/O device, wherein the parameters include an address of the I/O device and an indication of an amount of the data to be transferred, and wherein the one or more instructions include an address of the data to be transferred, means for receiving the parameters and the one or more instructions within the memory controller by the data movement engine, and means for performing the transfer of the data from the memory to the I/O device. The I/O device may be a graphics adapter. The data processing system may be a symmetric multiprocessor system having a plurality of processors coupled to the memory controller. The performing means may further include means for issuing pairs for read/write commands that read data portions from the memory and write these data portions to the I/O device, and means for stopping issuance of the read/write command pairs when a count has been reached, wherein the count is dependent upon the parameter indicating the amount of the data to be transferred. The parameters may be stored in registers within the memory controller and further include an address within system memory for storing status data indicating a status of the transfer of the data. The data processing system may further include means for writing of the status data to the address within the system memory indicating the status of the transfer of the data. The status data may indicate if the data has been transferred from the memory to the I/O device. The system may include means for polling by the processor of the address within the system memory for storing the status data. The data processing system may also include means in the processor for computing an effective address corresponding to the address to be transferred, means in the processor for computing an address of the data movement engine, and means in the processor for translating the effective address to a real address wherein the real address is sent to the data movement engine. The data processing system may be of a PowerPC architecture, wherein the one or more instructions consist of one of the following instructions: (1) eciwx (external control in word index), and (2) ecowx (external control out word index).

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

Figure 1:
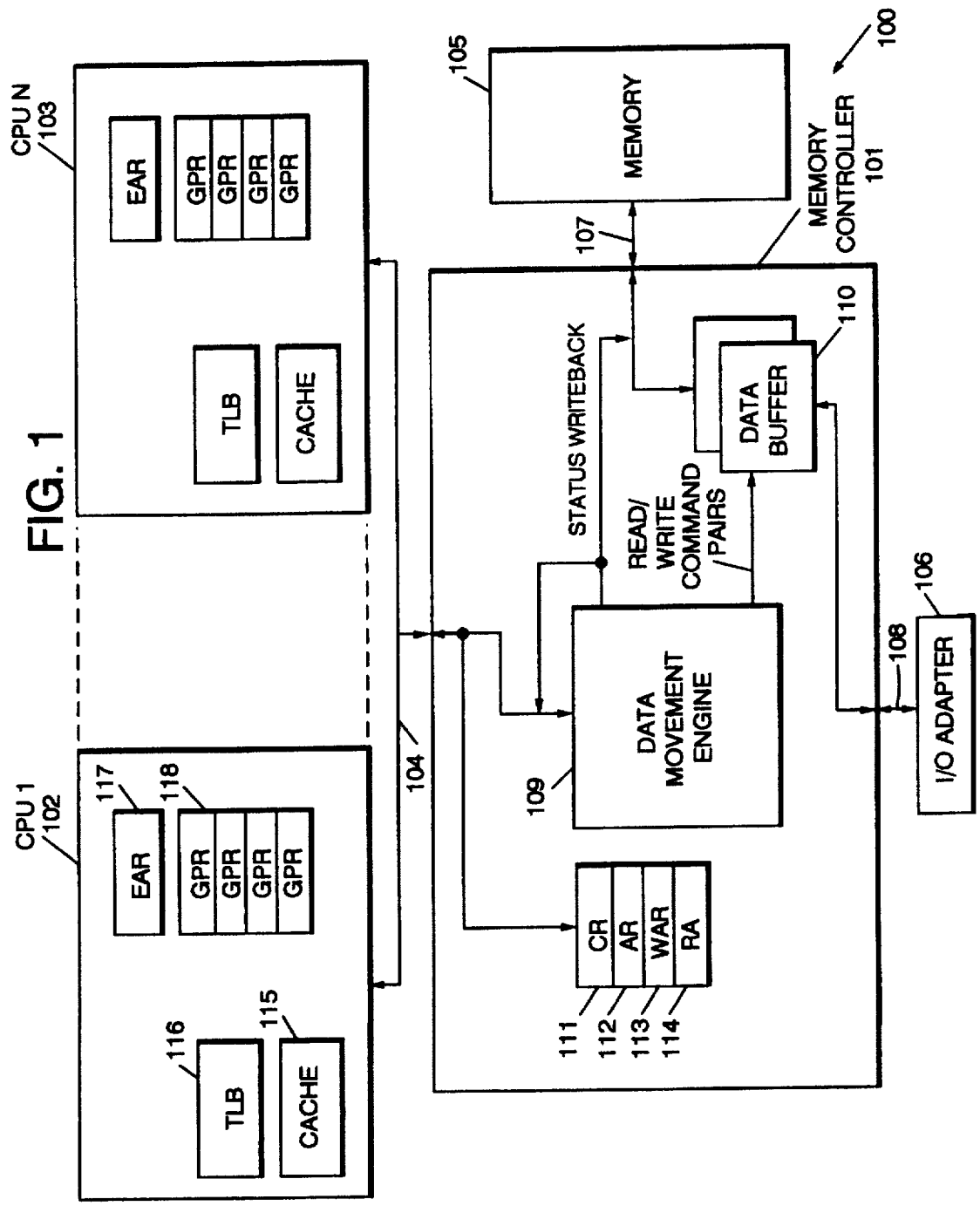
FIG. 1 frustrates a data processing system configured in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the description in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

As will be described below, the present invention provides for a more efficient transfer of data between memory and a device attached to the data processing system by utilizing a data movement engine within the memory controller for the data processing system. This data movement engine receives parameters and instructions specific to the transfer and proceeds to perform the transfer without further involvement from the initiating processor.

The invention is described with respect to an implementation within a PowerPC computer architecture, as produced by IBM and Motorola. However, the principles of the present invention may be practiced within any type computer architecture utilizing the transfer of block data between memory and other devices. (Note, the present invention could also operate for the transfer of data between two separate memory locations within a data processing system.)

The present invention makes efficient use of two instructions described below within the PowerPC architecture. These instructions are designed within the PowerPC architecture to perform a series of operations. These instructions could be replaced within the PowerPC architecture or within any other computer architecture utilizing the present invention by a set of corresponding program instructions.

The description below will be with respect to a transfer of data from system memory to an I/O device coupled to a data processing system. However, any of the other transfers indicated herein may also be performed in a similar manner.

In the PowerPC processor architecture there are two external device control instructions which act like a load or store to memory, in that the processor translates a virtual address to a real physical address and places it on the address bus of the processor, and then either loads a register with a word of data from its (system) data bus, or stores a word of data from a general purpose register (GPR) to the processor (system) data bus. In addition, these instructions source a resource identification parameter ("RID") along with these operations using additional pins. The Power PC architecture provides up to a five-bit field for this purpose which could allow up to 32 resources in a system. This RID can be used as an address to select a resource which uses the physical address on the address bus and the data on the data bus for its own unique purposes. These instructions are called external control out word indexed (ecowx) for the store type instruction and external control in word indexed (eciwx) for the load type instruction. The invention below uses these instructions to communicate to a data movement engine (resource). For a further discussion of these instructions, please refer to Book III, PowerPC Operating Environment Architecture, Appendix A, pp. 489–493, 1995, which is hereby incorporated by reference herein.

Referring to FIG. 1, symmetric multiprocessing system 100 is illustrated, comprising N (N is a positive integer) processors 102, 103 connected by system address and data bus 104 to system and memory controller 101 which controls memory 105 for system 100 and also bridges processors 102, 103 to various I/O buses 108. Shown is I/O adapter 106 coupled to buses 108. I/O adapter may be any known or contemplated I/O device, such as a display adapter or graphics adapter or an adapter for a multimedia device. Also located in system memory controller 101 is data movement engine (transfer resource) 109 which has a unique RID address. Locating transfer resource 109 in memory controller 101 allows transfers to be performed using memory burst size transfers whenever memory 105 is not busy servicing other processor requests.

Transfer resource 109 may comprise any well-known direct memory access (DMA) device implemented within memory controller 101 and configured in a unique manner as described herein.

Coupled to transfer resource 109 are registers 111-114 directly programmable by processor 102, 103 to control the transfers to be discussed below. Note, registers 111-114 may be located internal to engine 109.

Register 111 is a control register (CR) initialized with the length of the data transfer, a bit indicating the direction of the data transfer (to or from memory 105), and a bit indicating whether or not to increment the target address during the data transfer.

Register 112 is an adapter address register, initialized to the real address of I/O adapter 106. Note that register 112 could be loaded with a real memory address for memory-to-memory transfers.

Register 113 is the write back address register (WAR), initialized to the real address of a memory location used to place a completion status indicator of the operation. This status could be Dolled (read) by processor 102, 103 to check on the transfer progress; however, it is much more efficient for processor 102, 103 to read the memory location pointed to by the WAR, since it can be cached in its cache, and processor 102, 103 need not access system bus 104 polling for the completion status.

When transfer resource 109 finishes the transfer, it will store the status at the memory location indicated in WAR register 113, which will invalidate the processor's cached data, and processor 102, 103 will then automatically read the updated location containing the completion status from memory 105. In other words, register WAR 113 may point to a location within memory 105 where data movement engine 109 will store data indicating that the transfer of data has been completed or other various status information described below. When this occurs over bus 107, this status write back is also presented onto bus 104 so that processors 102, 103 can snoop the address of the memory location and the write command. This will invalidate the cache line (e.g., cache 115) in the processor that kicked off the data transfer.

Transfer resource 109 may be used to transfer up to a page of data, using burst transfers dictated by the memory access granularity and not the processor operand size, and without the setup overhead involved in translating the virtual real memory addresses and "pinning" the memory pages.

Figure 2:
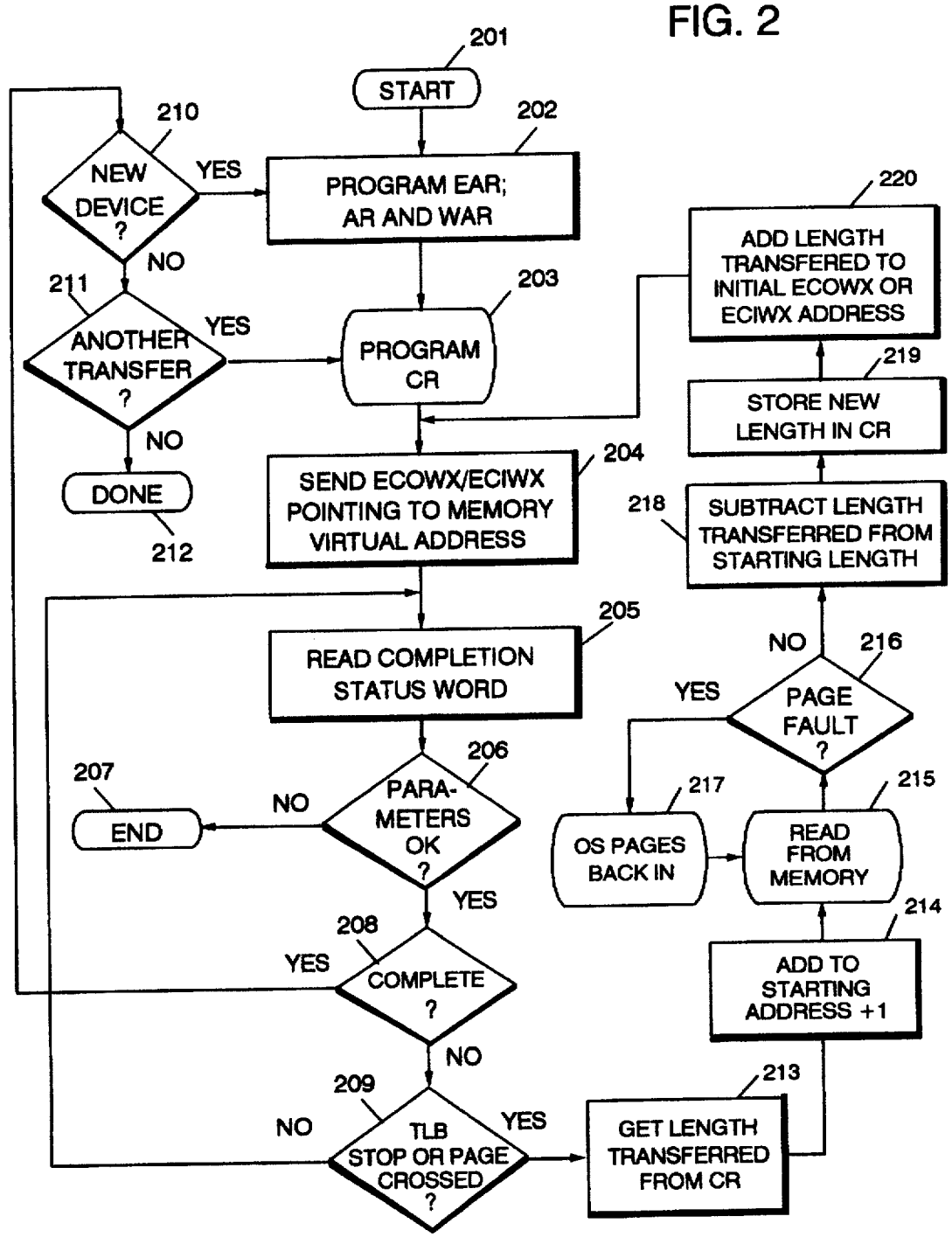
FIG. 2 illustrates a flow diagram in accordance with the present invention.

Referring next to FIG. 2, a process in accordance with the present invention begins with step 201. Note, this process may be hardwired or stored as a set of instructions programmed into system 100.

The transferring program first programs AR 112 with the real address of adapter 106, which is the source or destination of the data to be transferred, and internal processor register EAR ('external access register) 117 with the RID of transfer engine 109. These values are usually known by the transferring application (the application program transferring the data, such as a graphics intensive computer program), typically a device driver, and are hard configured, that is they do not change once the system is initialized.

Next, the process programs into WAR 113 a memory location in system memory 105 to use as a status mailbox. This does not change as it is compiled into its program. The process will have to obtain the real address of this location from the OS and pin it, but it will not change while the program is running.

Next, in step 203, the process writes into CR 111 the length and direction and automatic increment values noted above.

Figure 3:
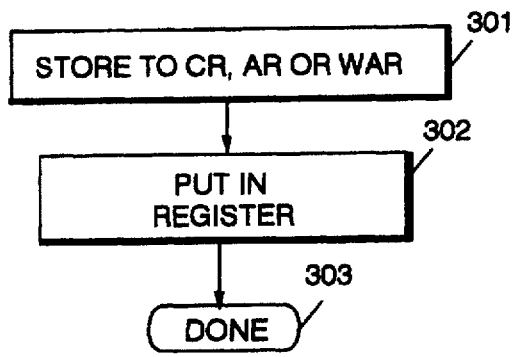
FIG. 3 illustrates a flow diagram of the storage of register values within the memory controller illustrated in FIG. 1.

Referring to FIG. 3, there is illustrated a process implemented within memory controller 101 for storing the above register values into registers 111–113. In step 301, the register values are stored from processor 102 to registers 111–114 in memory controller 101. In step 302, these values are placed within these registers. Step 303 indicates that this process has been completed.

In step 204, the process issues an ecowx or eciwx instruction pointing to the data area to move from/to memory 105. Processor 102 will translate the virtual address used by the ecowx or eciwx instruction to a real address, and pass it and the RID found in EAR register 117 onto system bus 104.

Figure 5:
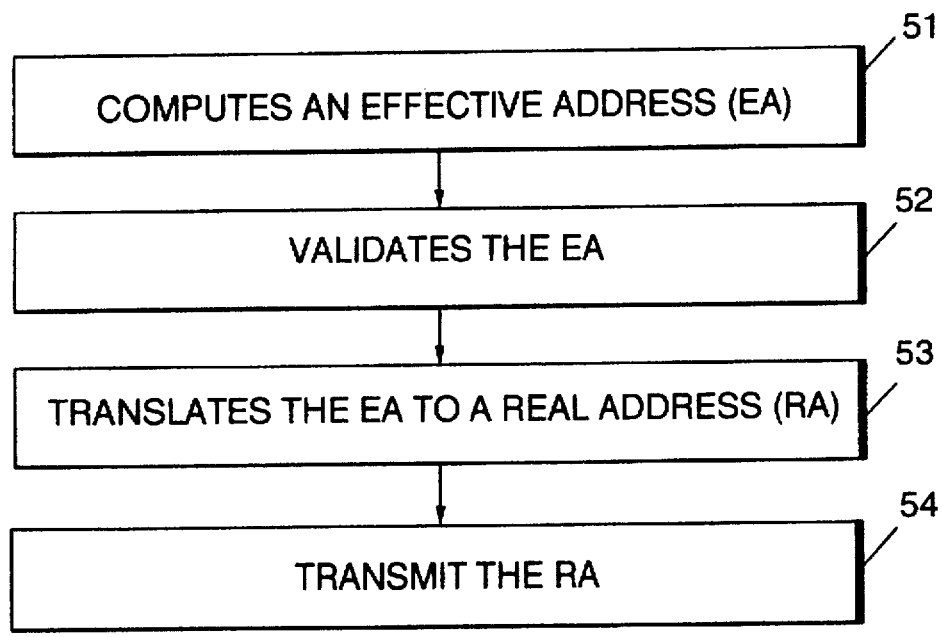
FIG. 5 illustrates a flow diagram of a translation of virtual addresses to real addresses.

Alternatively, instead of utilizing the ecowx or eciwx instruction, processor 102 may implement a corresponding similar set of program instructions illustrated by the flow diagram of FIG. 5. In step 51, processor 102 computes an effective address (virtual address) for the memory location of the data to be transferred. Next, in step 52, processor 102 validates this effective address. Next, in step 53, this effective address is translated to a real address utilizing TLB 116. Then, in step 54, this real address is transmitted onto system bus 104.

The remainder of this discussion will refer to the utilization of an ecowx or eciwx instruction. However, the set of program instructions illustrated in FIG. 5 may be utilized instead. If the set of program instructions illustrated in FIG. 5 are utilized, the real address transmitted from processor 102 onto bus 104 to memory controller 101 may be stored within real address ("RA") register 114.

In response to step 204, memory controller 101 will capture the ecowx/eciwx command code, decode the RID as its own, and then pass the address to transfer engine 109. Engine 109 does not use the data passed by the ecowx and will pass dummy data for an eciwx. Transfer resource 109 does not need any data, because the data it needs are already in CR 111, WAR 113 and AR 112. The process implemented within data movement (transfer) engine 109 after receipt of the ecowx/eciwx instruction is further described below with respect to FIG. 4.

Referring again to FIG. 2, in step 205, processor 102 reads the completion status word from cache 115. This completion status word may indicate that the transfer has been completed, may indicate that the parameters transferred were "bad," indicate that a page has been crossed, or indicate that a page may have been swapped out.

Next, in step 206, in response to the read completion status word, processor 102 determines whether or not the above parameters were transferred correctly and/or were "good" parameters. If not, the process ends at step 207 and the program will abnormally terminate. However, if the parameters are determined to be "good," the process proceeds to step 208 to determine if the transfer has been completed. If not, the process proceeds to step 209 to determine if the completion status indicates that the transfer has crossed a page boundary or that transfer engine 109 has terminated due to snooping a TLB operation, indicating that the page may have been swapped out. If neither of these occurred, the process within processor 102 will return to step 205 to again read the status word.

This loop will continue within processor 102 until a snoop of the status write back to the memory location indicated in register WAR 113 provides a different set of data for steps 206, 208, 209. If in step 208, the completion status word indicates that the transfer of data from memory 105 to I/O adapter 106, or vice versa, has been completed, then the process proceeds to step 210 to determine if a transfer to a new device coupled to system 100 has been requested. If so, the process proceeds to step 202 to program the EAR, AR and WAR values.

If a new device has not been indicated, the process proceeds to step 211 to determine if another transfer to or from I/O adapter 106 is requested. If another block of data is to be transferred to or from I/O adapter 106, the process proceeds to step 203 whereby register CR 111 is programmed with new information pertaining to the length and direction and automatic increment values for the new transfer of data from memory 105 to I/O adapter 106 or vice versa. If another transfer is not required, the process ends at step 212.

Figure 6:
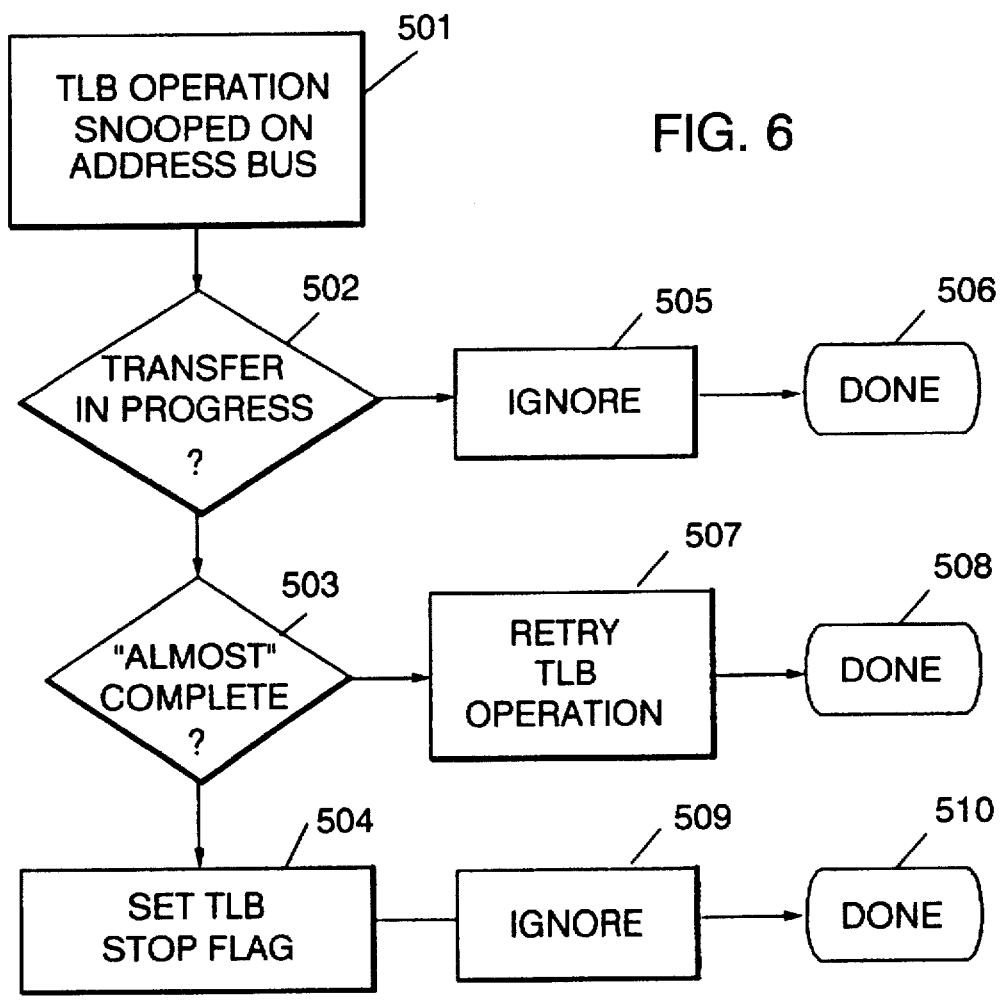
FIG. 6 illustrates a flow diagram of a detection of a TLB operation.

To solve the performance problem of pinning the real memory location, transfer resource 109 operates without pinning the pages. To do this it constantly "snoops" system bus 104 for TLB operations that processors 102, 103 send to one another to invalidate pages before swapping them to disk. Referring to FIG. 6, if transfer engine 109 detects a TLB operation by snooping address bus 104 (step 501), it may indicate such a swap out may be about to occur. If no transfer is active, the TLB operation is ignored (steps 502, 505, 506). If a transfer is in progress and it is "almost" complete (step 503) indicated by the current length to transfer in CR 111 being less than some implementation defined value, memory controller 101 will "retry" the TLB operation (step 507), causing it to be reissued by the processor. This will continue until the transfer is finished. If in step 503 the transfer is not near completion, the logic proceeds to step 504 where a flag is set for the transfer engine to test in order to terminate at the next convenient point (step 209). Memory controller 101 then ignores the TLB in step 509 and terminates the snooping in step 510.

Referring again to FIG. 2, if processor 102 reading the status in step 209 detects that a page has been crossed or a TLB stop has occurred, it proceeds to step 213 where it reads the length of the data transfer that has completed, adds this to the starting transfer address plus one byte in step 214, and then performs a normal read from memory in step 215. This is done to see if the new page location is still in memory. If in step 216 a page fault occurs, the operating system will suspend this process, swap the referenced page back in step 217, and then return to the process which repeats the read in step 215. If no page fault occurs, the process proceeds to step 218 where the length already transferred is subtracted from the original transfer size and then in step 219 proceeds to store the new length in CR 111. The process then proceeds to step 220 where the original address is adjusted to reflect the new starting point, and then control returns to step 204 where the ecowx/eciwx instruction is reissued. The data transfer will then be resumed.

Figure 4:
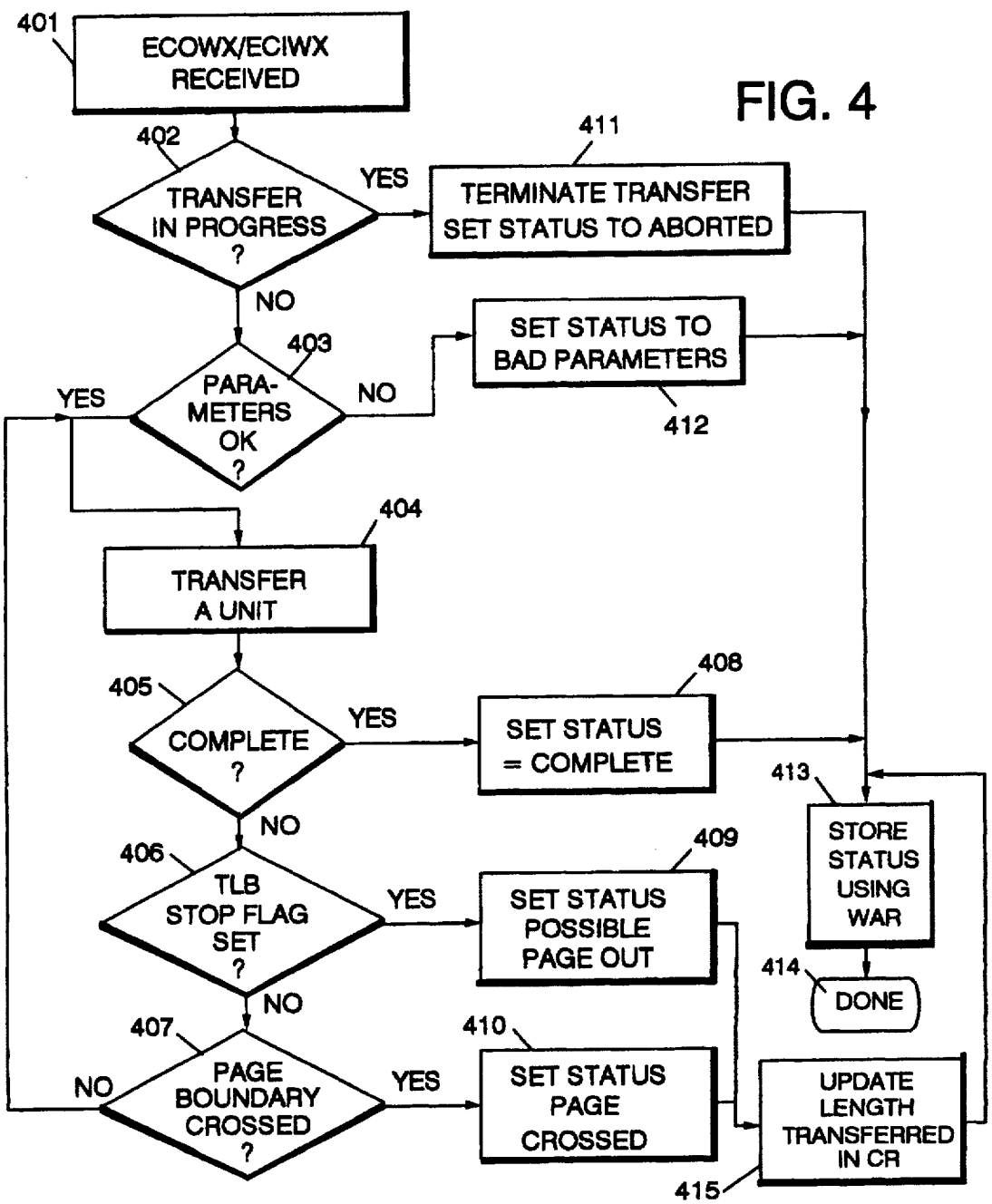
FIG. 4 illustrates a flow diagram in accordance with an operation of a transfer engine in accordance with the present invention.

Referring next to FIG. 4, a process implemented within memory controller 101 is initiated upon receipt of the ecowx/eciwx instruction in step 401. Next, in step 402, the process determines whether or not a transfer of data is already in progress. If yes, in step 411, this new data transfer will be terminated and such termination will be written within the status write back operation to the memory location indicated by register WAR 113. This storing of this status is performed in step 413. The process within memory controller 101 is completed in step 414. This termination status will be snooped by processor 102 to invalidate the corresponding cache line within cache 115, so that this status word can be read in step 205.

If a transfer is not in progress, the process proceeds to step 403 for a determination of whether or not the transferred parameters within registers 111-114 are "good." If any of the parameters are "bad," this status is set within step 412 for storage in step 413 to the memory location indicated by the value within register WAR 113. However, if all the parameters are "good," the process proceeds to step 404 where a unit or block of data is transferred by transfer engine 109, which is implemented by issues of paired read/write commands to memory controller 101. This is indicated in FIG. 1 as a transmission of the read/write command pairs to data buffer 110, which will receive data read from memory 105 for a subsequent write to I/O adapter 106, or if the direction bit in CR 111 indicates a transfer from I/O adapter 106 to memory 105, a paired read from I/O adapter 106 and subsequent write to memory 105.

Next, in step 405, the process determines whether or not the data transfer has been completed. If yes, this completion status is set in step 408 for a subsequent write to the memory location indicated by the value within register WAR 113. This completion status is utilized within the process illustrated by FIG. 2 within decision block 208.

If completion of the transfer of data has not been completed, the process proceeds to step 406 whereby the process determines whether or not the TLB stop flag has been set as described above. If transfer engine 109 detects a TLB stop flat set (step 406), the process proceeds to step 409 to set the completion status as "transfer stopped due to possible page swap." If no TLB stop is detected in step 406, the operation proceeds to step 407 where a test is performed to see if a page boundary is about to be crossed. If yes, the status is set to indicate a page crossing in step 410. Both steps 409 and 410 then proceed to update the length in CR 111 to indicate how many bytes were transferred before terminating the transfer (step 415). The process proceeds to step 413 where the status is stored in memory using the WAR 113, and the transfer terminates in step 414.

If in step 407, a page boundary has not been crossed, the process returns to step 404 to continue transfer of the data.

Using the PowerPC external control instructions to pass a translated address to transfer engine 109 located in system memory controller 101, together with previously setup control registers 111-114 in memory controller 101, a fast data movement is accomplished with minimum CPU overhead and little system bus bandwidth used. This method is especially useful for transferring large amounts of data between memory and a graphics or multimedia device.

Although the present invention and its advantages have been described in detail, it should be understood that various changes, substitutions and alterations can be made herein without departing from the spirit and scope of the invention as defined by the appended claims.

What is claimed is:

1. In a data processing system, a method for transferring data from a source device to a target device, said method comprising the steps of:

determining an address of a data movement engine to perform said transferring of said data;

sending parameters and one or more instructions from a processor to said data movement engine in a memory controller for performing said transferring of said data from said source device to said target device, wherein said parameters include an address of said target device and an indication of an amount of said data to be transferred, and wherein said one or more instructions include an address of said data to be transferred;

receiving said parameters and said one or more instructions within said memory controller by said data movement engine; and performing said transferring of said data from said source device to said target device.

2. The method as recited in claim 1, wherein said source device is a memory device coupled to said memory controller.

3. The method as recited in claim 1, wherein said target device is a memory device coupled to said memory controller.

4. The method as recited in claim 2, wherein said target device is an I/O device coupled to said memory controller.

5. The method as recited in claim 4, wherein said I/O device is a multimedia adapter.

6. The method as recited in claim 3, wherein said source device is an I/O device coupled to said memory controller.

7. The method as recited in claim 1, wherein said data processing system is a symmetric multiprocessor system having a plurality of processors coupled to said memory controller.

8. The method as recited in claim 1, wherein said performing step further comprises the steps of:

issuing pairs of read/write commands that read data portions from said source device and write these data portions to said target device; and stopping issuance of said read/write command pairs when a count has been reached, wherein said count is dependent upon said parameter indicating said amount of said data to be transferred.

9. The method as recited in claim 1, wherein said parameters further include an address within system memory for storing status data indicating a status of said transferring of said data, said method further comprising the step of:

writing said status data to said address within said system memory indicating said status of said transferring of said data.

10. The method as recited in claim 9, wherein said status data indicates if said data has been transferred from said source device to said target device.

11. The method as recited in claim 9, wherein said status data indicates that a page boundary has been crossed.

12. The method as recited in claim 9, wherein said status data indicates that a TLB operation has been detected, and wherein said data movement engine detects said TLB operation by a snoop operation.

13. The method as recited in claim 9, further comprising the step of:

polling by said processor of said address within said system memory for storing said status data.

14. The method as recited in claim 13, further comprising the step of:

initiating another data transfer in response to said polling step.

15. The method as recited in claim 1, further comprising the steps of:

computing an effective address corresponding to said address of said data to be transferred;

computing an address of said data movement engine; and translating said effective address to a real address, wherein said real address is sent to said data movement engine.

16. The method as recited in claim 1, further comprising the step of:

aborting said transfer if it is determined that a previous data transfer is in progress.

17. The method as recited in claim 1, further comprising the step of: aborting said transfer if it is determined that a parameter is faulty.

18. In a data processing system, a method for transferring data from a source device to a target device, said method comprising the steps of:

sending parameters and one or more instructions from a processor to a memory controller for performing said transferring of said data from said source device to said target device, wherein said parameters include an address of said target device and an indication of an amount of said data to be transferred, and wherein said one or more instructions include an address of said data to be transferred;

receiving said parameters and said one or more instructions within said memory controller by a data movement engine; and performing said transferring of said data from said source device to said target device, wherein said data processing system is of a PowerPC architecture, and wherein said one or more instructions consist of one of the following instructions:

eciwx (external control in word indexed); and
ecowx (external control out word indexed).

19. A data processing system comprising:

a processor a memory controller, wherein said memory controller includes a data movement engine;

a memory coupled to said memory controller;

a bus coupling said processor to said memory controller;

an I/O device coupled to said memory controller;

means for determining an address of said data movement engine;

means for sending parameters and one or more instructions from said processor to said data movement engine within said memory controller for performing a transfer of data from said memory to said I/O device, wherein said parameters include an address of said I/O device and an indication of an amount of said data to be transferred, and wherein said one or more instructions include an address of said data to be transferred;

means for receiving said parameters and said one or more instructions within said memory controller by said data movement engine; and means for performing said transfer of said data from said memory to said I/O device.

20. The data processing system as recited in claim 19, wherein said I/O device is a graphics adapter.

21. The data processing system as recited in claim 19, wherein said data processing system is a symmetric multiprocessor system having a plurality of processors coupled to said memory controller.

22. The data processing system as recited in claim 19, wherein said performing means further comprises:

means for issuing pairs of read/write commands that read data portions from said memory and write these data portions to said I/O device; and means for stopping issuance of said read/write command pairs when a count has been reached, wherein said count is dependent upon said parameter indicating said amount of said data to be transferred.

23. The data processing system as recited in claim 19, wherein said parameters are stored in registers within said memory controller and further include an address within system memory for storing status data indicating a status of said transfer of said data, said data processing system further comprising:

means for writing said status data to said address within said system memory indicating said status of said transfer of said data.

24. The data processing system as recited in claim 23, wherein said status data indicates if said data has been transferred from said memory to said I/O device.

25. The data processing system as recited in claim 24, further comprising:

means for polling by said processor of said address within said system memory for storing said status data.

26. The data processing system as recited in claim 22, further comprising:

means in said processor for computing an effective address corresponding to said address of said data to be transferred;

means in said processor for computing an address of said data movement engine; and means in said processor for translating said effective address to a real address, wherein said real address is sent to said data movement engine.

27. A data processing system comprising:

a processor;

a memory controller, wherein said memory controller includes a data movement engine;

a memory coupled to said memory controller;

a bus coupling said processor to said memory controller;

an I/O device coupled to said memory controller;

means for sending parameters and one or more instructions from said processor to said memory controller for performing a transfer of data from said memory to said I/O device, wherein said parameters include an address of said I/O device and an indication of an amount of said data to be transferred, and wherein said one or more instructions include an address of said data to be transferred;

means for receiving said parameters and said one or more instructions within said memory controller by said data movement engine; and means for performing said transfer of said data from said memory to said I/O device, wherein said data processing system is of a PowerPC architecture, and wherein said one or more instructions consist of one of the following instructions:

eciwx (external control in word indexed); and ecowx (external control out word indexed).

28. In a data processing system, a method for transferring data from a source to a target, said method comprising the steps of:

determining an address of said target;

determining an amount of said data to be transferred;

determining an address of said data to be transferred, said address of said data to be transferred corresponding to said source;

determining an address of a transfer engine to perform said transferring of said data;

determining an address of a memory location where status information is to be stored, wherein said status information pertains to said transferring of said data;

sending said address of said target, said amount of said data to be transferred, and said address of said memory location where status information is to be stored to said transfer engine;

sending said address of said data to be transferred to said transfer engine;

receiving said address of said target, said amount of said data to be transferred, said address of said memory location where status information is to be stored, and said address of said data to be transferred by said transfer engine;

determining if an existing data transfer is already in progress;

aborting said transferring of said data if it is determined that said existing data transfer is in progress;

issuing pairs of read/write commands that read data portions from said source and write these data portions to said target;

stopping issuance of said read/write command pairs when a count has been reached, wherein said count is dependent upon said amount of said data to be transferred;

writing an indication that said data has been transferred from said source to said target to said memory location where said status information is to be stored;

polling by said processor of an address pertaining to said memory location; and initiating another data transfer in response to said polling step.

29. The method as recited in claim 28, wherein said data processing system is of a PowerPC architecture, and wherein said address of said data to be transferred by said transfer engine accompanies one of the following instructions:

eciwx (external control in word indexed); and ecowx (external control out word indexed).

30. The method as recited in claim 28, further comprising the step of:

temporarily suspending said transferring of said data if a page removal operation is detected.

* * * * *